(12) United States Patent
Whelan et al.

(10) Patent No.: US 6,414,782 B1
(45) Date of Patent: Jul. 2, 2002

(54) LUMINOUS INTENSITY SENSOR ELEMENT AND LIGHT BEAM MODULATING METHOD AND DEVICE EMPLOYING SUCH A SENSOR ELEMENT

(75) Inventors: Maurice Whelan, Angera; Robert P. Kenny, Gavirate, both of (IT); John T. Sheridan, Dublin (IE); Alfredo C. Lucia, Osmate (IT)

(73) Assignee: European Atomic Energy Community (Euratom), Luxembourg (LU)

( * ) Notice: Subject to any disclaimer, the term of this patent is extended or adjusted under 35 U.S.C. 154(b) by 0 days.

(21) Appl. No.: 09/463,266
(22) PCT Filed: Jul. 20, 1998
(86) PCT No.: PCT/EP98/04530
§ 371 (c)(1),
(2), (4) Date: May 15, 2000
(87) PCT Pub. No.: WO99/05490
PCT Pub. Date: Feb. 4, 1999

(30) Foreign Application Priority Data

Jul. 21, 1997 (EP) ................................. 97830376

(51) Int. Cl.⁷ ........................... G02B 26/00; G02F 1/01
(52) U.S. Cl. ................. 359/291; 359/288; 359/289; 359/290; 359/298
(58) Field of Search ................. 359/288, 289, 359/290, 291, 298

(56) References Cited

U.S. PATENT DOCUMENTS 6,236,491 B1 * 5/2001 Goodwin-Johnson ....... 359/291

* cited by examiner

Primary Examiner—Georgia Epps
Assistant Examiner—Michael A. Lucas
(74) Attorney, Agent, or Firm—Frost Brown Todd LLC

(57) ABSTRACT

A luminous intensity sensor element having a flat disk-shaped element (2) made of material with a high thermal expansion coefficient and of low thermal conductivity, and in turn having, on opposite faces (3, 5), an optically absorbent layer (4) and a reflecting layer (6). On receiving excitation radiation (R), the optically absorbent layer (4) is heated and transmits heat to the flat disk-shaped (2), which in turn is heated internally in spatially nonuniform manner and is deformed together with the superimposed reflecting layer (6). The reflecting layer (6) receives an incident reference layer beam (S) to generate a reflected light beam having optical characteristics ($\Delta\phi$) depending on the aforementioned deformation ($\Delta d$) and varying in response to the excitation radiation.

13 Claims, 1 Drawing Sheet

LUMINOUS INTENSITY SENSOR ELEMENT AND LIGHT BEAM MODULATING METHOD AND DEVICE EMPLOYING SUCH A SENSOR ELEMENT

TECHNICAL FIELD

The present invention relates to a luminous intensity sensor element, and a light beam modulating method and device employing such a sensor element.

BACKGROUND ART

Extensive research is currently being conducted into devising fully optical devices, which, as compared with electronic or optoelectronic devices, afford numerous advantages in terms of performance and efficiency, and may be used to advantage in hostile environments, such as those with a high degree of electromagnetic radiation. In particular research has recently been undertaken into devising optical devices for use in so-called "intelligent" or "smart" structures, i.e. capable of reacting in controlled manner to an external mechanical or thermo-mechanical stimulus. Much of this research is centered around devising materials of given opto-thermomechanical performance, which may be used, for example, to fabricate devices exploiting the intensity of light radiation (typically visible to infrared region of electromagnetic spectrum) to achieve a given physical response.

DISCLOSURE OF INVENTION

It is an object of the present invention to provide a luminous intensity sensor element, which is easy and cheap to produce, is compact and lightweight, and may be used to advantage in fully optical devices.

According to the present invention, there is provided a luminous intensity sensor element as claimed in claim 1.

The present invention also relates to a straightforward, effective method of modulating a light beam using the above-defined sensor element.

According to the present invention, there is provided a method of modulating a light beam, as claimed in claim 5.

The present invention also relates to a device for modulating a light beam, employing the sensor element according to the invention, and implementing the above-defined method.

According to the present invention, there is provided a device for modulating a light beam, as claimed in claim 11.

BRIEF DESCRIPTION OF THE DRAWINGS

A preferred, non-limiting embodiment of the present invention will be described by way of example with reference to the accompanying drawings, in which.

BEST MODE FOR CARRYING OUT THE INVENTION

Figure 1:
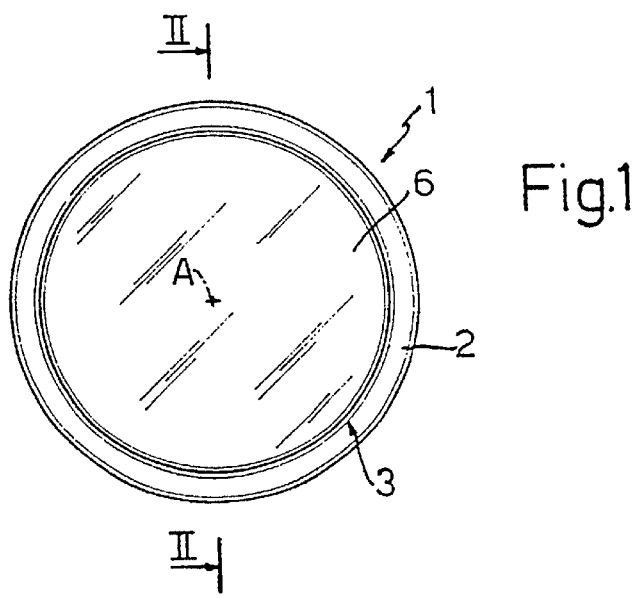
FIG. 1 shows a front view of a sensor element in accordance with the present invention.
Figure 2:
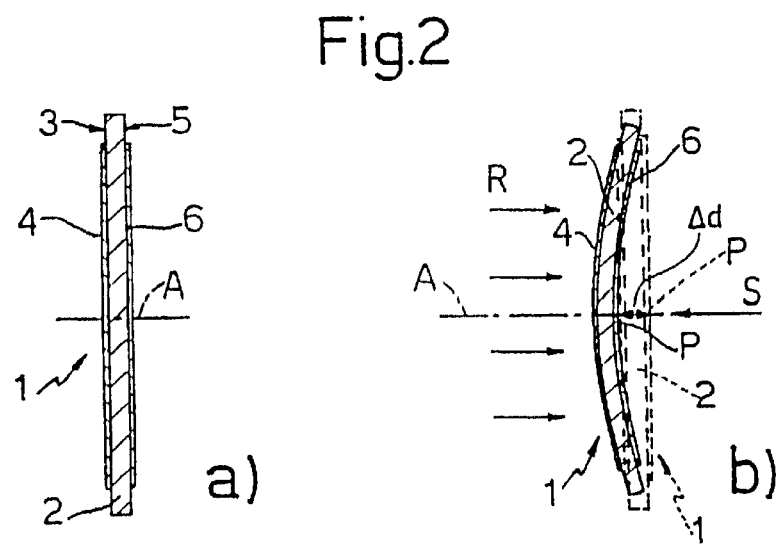
FIGS. 2a and 2b show sections along line II—II in FIG. 1 of the sensor element according to the invention in the idle and operating condition respectively.

The sensor element 1 in FIGS. 1 and 2 comprises a transparent disk 2 of axis A, having a first flat circular face 3 with an optically absorbing coating 4, and a second flat circular face 5 with a reflecting coating 6. Each coating 4, 6 comprises a thin flat circular layer coaxial with axis A and covering substantially the whole of respective face 3, 5.

Disk 2 is made of material with a high thermal expansion coefficient and of low thermal conductivity, and is of a thickness much smaller than the diameter. For example, disk 2 may be made of acrylic plastic, of a few millimeters in thickness, and a few tens of millimeters in diameter. Absorbing coating 4, on the other hand, comprises a thin layer of material with a high optical absorption index (at least for the wavelengths concerned) and of high thermal conductivity. For example, absorbing coating 4 may be made of amorphous carbon, of a few tens of micrometers in thickness. The reflecting coating may be simply a thin layer of aluminium deposited on disk 2.

As shown in FIG. 2b, optical element 1 (shown by the dotted line in the undeformed idle condition also shown in FIG. 2a) receives, on the exposed surface of absorbent coating 4, excitation radiation R (a diffuse light beam in the example shown), which is absorbed by coating 4 in which the energy of incident radiation R is converted into heat, which is transmitted by conduction to face 3 of disk 2 and then to face 5. Within a short time, an exponential temperature distribution is formed axially inside disk 2, with a maximum temperature on face 3 and a minimum temperature on face 5.

As a result of the temperature gradient inside and the high thermal expansion coefficient of the material of which it is made, sensor element 1 assumes a deformed operating configuration (shown by the continuous line in FIG. 2b) in which it flexes in the opposite direction to the propagation direction of light beam R. This deformation of sensor element 1 is easily explained, if disk 2 is imagined as being divided into a succession of infinitely thin axially-superimposed layers (not shown) located between a first layer (not shown) adjacent to absorbent coating 4, and a last layer (not shown) adjacent to reflecting coating 6. As a result of the aforementioned temperature distribution inside disk 2, the first layer (at maximum temperature) therefore undergoes maximum radial deformation; the last layer (at minimum temperature) undergoes minimum radial deformation; the intermediate layers undergo deformation decreasing gradually from the first to the last layer; and the differing radial deformation of the various consecutive layers combines to flex disk 2 as described above.

According to the present invention, such flexing may be used to advantage to modify the optical path of a reference light beam, in particular a laser beam S traveling in the direction defined by axis A and impinging on a central portion of reflecting coating 6, and so modulating the phase of laser beam S.

When disk 2 is undeformed, laser beam S impinges on a central point P of reflecting coating 6 and is reflected. If an exciting radiation R is directed on to sensor element 1, disk 2 flexes as described above, so that central point P is shifted by a distance $\Delta d$ with respect to the undeformed position.

Consequently, as compared with the path traveled when reflected from undeformed element 1, laser beam S must travel along a further path of length $2\Delta d$, thus undergoing a phase variation of $\Delta \phi = (2\pi/\lambda) \cdot 2\Delta d$.

As such, sensor element 1, together with exciting radiation R and reference beam S, defines a fully optical input/output system comprising no mechanically operated parts, and which, in response to an input signal (exciting radiation R) generates an output signal (reflected laser beam S of modified phase) related to the input signal.

The output signal may be used in various way. For example, the reflected laser beam S may be used in a known measuring device not shown (e.g. an interferometer device) to determine the above phase variation. As the phase variation is related to shift $\Delta d$, which in turn is related to the intensity of incident radiation R, it is possible, by means of mathematical equations, to work out the intensity of the incident radiation and form an input/output system for measuring the intensity of the input signal on the basis of the output signal.

Alternatively, element 1 may be used directly as a component part of an interferometer, in particular as a reflecting element movable in response to a control signal. Known interferometers, in fact, are known to feature reflecting devices comprising reflecting mirrors movable by mechanical or electric actuators to vary the optical path of a branch of the interferometer. By varying the position of a reflecting surface, element 1 according to the present invention may be used to advantage in place of such reflecting devices. Moreover, the reflecting surface and the actuating element are formed on a single substrate, and actuation is achieved by excitation radiation R, thus enabling the mechanical or electric actuators to be dispensed with.

Figure 3:
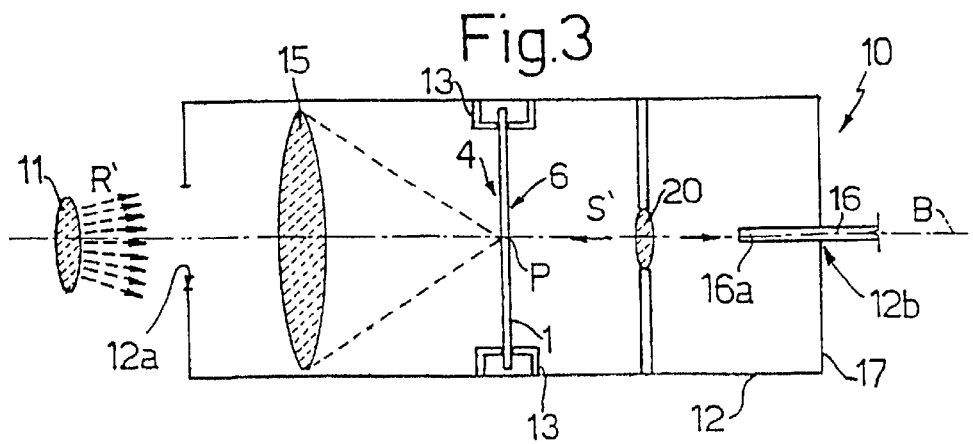
FIG. 3 shows an optical device featuring the sensor element in FIGS. 1 and 2.

Number 10 in FIG. 3 indicates an optical device wherein sensor element 1 is used, as described above, to modulate a reference laser beam S' as a function of the intensity I of excitation radiation R' generated by a conventional or laser light source 11.

Device 10 comprises a cylindrical tubular casing 12 of axis B, aligned with light source 11, and having a front end opening 12a for the admission of exciting radiation R'.

Sensor element 1 is housed inside casing 12 with axis A coaxial with axis B, and with absorbing coating 4 facing opening 12a and light source 11, and is fitted stably to casing 12 by fastening elements 13 integral with casing 12 and contacting peripheral portions of disk 2. Casing 12 also houses a first biconvex lens 15 slightly smaller than the transverse dimensions of casing 12, located between opening 12a and element 1, and for focusing excitation radiation R' on to a central portion of absorbing coating 4.

Casing 12 is closed by a rear wall 17 having a central hole 12b, coaxial with axis B and engaged by an optical fiber 16 aligned with axis B and having an end portion 16a housed inside casing 12. A further biconvex lens 20, much smaller than lens 15 and located coaxially with axis B between element 1 and end portion 16a, focuses the light from optical fiber 16 on to a point P of reflecting coating 6, and directs the light reflected by reflecting coating 6 on to end portion 16a of optical fiber 16.

In actual use, the excitation radiation R' generated by source 11 enters casing 12 through opening 12a and is focused by lens 15 on to the central portion of absorbing coating 4. Inside absorbing coating 4, the energy of exciting radiation R' is converted into heat, which is transmitted rapidly by conduction to the portion of disk 2 closest to the portion on which exciting radiation R' is focused (i.e. the central portion of face 3), and from there is diffused to the colder peripheral portions of disk 2. Unlike the situation described with reference to FIG. 2b, the heat in this case is concentrated in a small portion of face 3, and is therefore diffused not only axially towards the cooler layers, but also radially towards the peripheral edge of disk 2.

In view of the low thermal conductivity of disk 2, the temperature soon decreases exponentially in both the axial and radial direction, with a maximum temperature at the central portion of face 3; and sensor element 1 flexes as described previously, except that, for each axial layer, and hence for disk 2 as a whole, deformation is greater at the central than at the peripheral portion. As such, total flexure of disk 2, i.e. the shift in point P with respect to the undeformed position, is greater than when absorbing coating 4 is illuminated evenly, as described previously.

In this case, too, point P shifts by distance $\Delta d'$, and the phase of reference beam S' is varied, with respect to the idle condition (sensor element 1 undeformed) by $\Delta\phi=(2\ \pi/\lambda)\cdot 2\Delta d'$. The reflected reference beam S' is focused by lens 20 on to the input of optical fiber 16 and directed out of casing 12 to a further optical device (e.g. a measuring device).

Both sensor element 1 and device 10 have the advantage of being cheap and easy to produce, and having rapid response times. Sensor element 1 is mechanically strong and reliable, operates passively (i.e. consumes no energy), has a high ratio between flexure and the intensity of incident radiation R, and is therefore sensitive to even very low-intensity radiation. Moreover, it is compact and simple in shape, and may therefore be integrated in optical devices other than the one in the invention, or may be used in configurations other than the one described, e.g. to operate as an optical switch.

Being fully optical, both sensor element 1 and device 10 may be used to advantage in environments subject to electromagnetic interference, and in which the use of electronic devices is unadvisable.

Clearly, changes may be made to the sensor element, method and device as ,described and illustrated herein without, however, departing from the scope of the present invention.

In particular, sensor element 1 may comprise a number of integral superimposed layers, e.g. a number of layers with absorption indexes gradually decreasing from a high-absorption-index layer receiving exciting radiation R, to a lower-absorption-index layer supporting reflecting coating 6.

In addition, the materials and size (diameter and thickness) of the various parts of the sensor element (disk 2 and coatings 4, 6) may be varied during production, according to the operating conditions involved and the type of performance required.

Depending on the application, both absorbing coating 4 and reflecting coating 6 may be wide-band or frequency-selective; absorbent coating 4 may be partially or fully absorbent; and reflecting coating 6 may be partially or fully reflective. In the event coating 4 is only partially absorbent and coating 6 is only partially reflecting, coating 4 or coating 6 may be subjected to a beam of highly coherent light (e.g. a laser beam), which, on penetrating disk 2, undergoes a self-modulating effect (in phase and/or intensity) similar to that of nonlinear optical means.

What is claimed is:

1. A luminous intensity sensor element, characterized by comprising:

at least a deformable flat element (2) made of a single thermally expandable material;

at least an optically absorbing coating layer (4) covering a first face (3) of said deformable element (2); and at least a reflecting coating layer (6) covering a second face (5) of said deformable element; (2);

said optically absorbing coating layer (4) receiving exciting radiation (R) for heating the optically absorbing coating layer (4) so that the energy of the exciting radiation (R) is converted into heat that is transmitted by conduction to said deformable element (2); said deformable flat element (2) being heated in spatially non uniform manner with a maximum of temperature on the first face (5) and a minimum of temperature on the second face (5); said deformable flat element (2) being deformed at least partially as a result of the temperature gradient inside the deformable element (2) and said deformation (Δd) being transmitted to the reflecting coating layer (6) to produce a deformation (Δd) of the reflecting coating layer (6); said reflecting coating layer (6) being suitable for receiving an incident reference light beam (S) and generating a reflected light beam having optical characteristics (Δφ) depending on said deformation (Δd) and varying in response to said exciting radiation (R).

2. A sensor element as claimed in claim 1 characterised in that said deformable element (2) is of a thickness greater than the thickness of said optically absorbing layer (4) and said reflecting layer (6).

3. A sensor element as claimed in claims 1 or 2 characterised in that said deformable element (2) is substantially disk-shaped.

4. A method of modulating a light beam, characterized of comprising the steps of:
  forming a sensor element comprising at least a deformable flat element (2) made of a single thermally expandable material; at least an optically absorbing coating layer (4) covering a first face (3) of said deformable element (2); and at least a reflecting coating layer (6) covering a second face (5) of said deformable element (2);
  directing an exciting radiation onto said optically absorbing coating layer (4) for heating the optically absorbing coating layer (4) so that the energy of the exciting radiation (R) is converted into heat that is transmitted by conduction to said deformable element (2); said deformable flat element (2) being heated in spatially non uniform manner with a maximum of temperature on the first face (5) and a minimum of temperature on the second face (5); said deformable flat element (2) being deformed at least partially as a result of the temperature gradient inside the deformable element (2) and said deformation (Δd) being transmitted to the reflecting coating layer (6) to produce -a deformation (Δd) of the reflecting coating layer (6);
  directing on to said reflecting layer (6) an incident reference light beam (S) to generate a reflected light beam having optical characteristics (Δφ) depending on said deformation (Δd) and varying in response to said exciting radiation (R) to modulate said incident reference light beam (S) in response to said exciting radiation (R).

5. A method as claimed in claim 4, characterised by comprising the step of focusing (20) said incident reference light beam (S) on to a central portion of said reflecting coating layer (6).

6. A method as claimed in claims 4 or 5, characterised in that said incident reference light beam (S; S') comprises at least a laser beam.

7. A method as claimed in one of the foregoing claims from 4 or 5, characterised by comprising the step of focusing (15) said exciting radiation (R; R') on to a central portion of said optically absorbing coating layer (4).

8. A method as claimed in any one of the foregoing claims from 4 or 5, characterised by comprising the step of securing said sensor element (1) to a supporting structure (12) by at least a peripheral portion of said sensor element (1).

9. A device for modulating a light beam, characterized by comprising:
  a casing (12) in turn comprising at least a first opening (12a) for the admission of exciting radiation (R'), and at least a second opening (12b) for the admission of an incident reference light beam (S');
  a sensor element (1) housed in said casing (12) and comprising at least a deformable flat element (2) made of a single thermally expandable material; at least an optically absorbing coating layer (4) covering a first face (3) of said deformable element (2); and at least a reflecting coating layer (6) covering a second face (5) of said deformable element (2);
  fastening means (13) for securing said sensor element (1) to said casing (12);
  said optically absorbing coating layer (4) receiving said exciting radiation (R) for heating the optically absorbing coating layer (4) so that the energy of the exciting radiation (R') is converted into heat that is transmitted by conduction to said deformable element (2); said deformable flat element (2) being heated in spatially non uniform manner with a maximum of temperature on the first face (5) and a minimum of temperature on the second face (5); said deformable flat element (2) being deformed at least partially as a result of the temperature gradient inside the deformable element (2) and said deformation (Δd) being transmitted to the reflecting coating layer (6) to produce, together with said fastening means (13), a deformation (Δd) of the reflecting coating layer (6); said reflecting coating layer (6) being suitable for receiving said incident reference light beam (5) and generating a reflected light beam having optical characteristics (Δφ) depending on said deformation (Δd) and varying in response to said exciting radiation (R).

10. A device as claimed in claim 9, characterised by comprising first focusing means (15) fitted to said casing (12) and for focusing said exciting radiation (R') on to a central portion of said optically absorbing coating layer (4).

11. A device as claimed in claim 9 or 10, characterised by comprising second focusing means (20) fitted to said casing (12) and for focusing said incident reference light beam (S') on to a central portion of said reflecting coating layer (6).

12. A device as claimed in claim 9, characterised by comprising conveying means (16) for conveying said incident reference light beam (S') into said casing (12); and conveying means (16) for conveying said reflected light beam out of said casing (12).

13. A device as claimed in claim 12, characterised in that said conveying means (16) comprise at least an optical fiber.

* * * * *